(12) United States Patent
Lin

(10) Patent No.: US 10,932,244 B2
(45) Date of Patent: Feb. 23, 2021

(54) CHANNEL TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/703,469

(22) Filed: Dec. 4, 2019

(65) Prior Publication Data
US 2020/0112951 A1    Apr. 9, 2020

Related U.S. Application Data

(63) Continuation of application No. PCT/CN2017/088806, filed on Jun. 16, 2017.

(51) Int. Cl.
*H04W 72/00* (2009.01)
*H04W 72/04* (2009.01)
*H04L 5/00* (2006.01)

(52) U.S. Cl.
CPC ....... *H04W 72/0413* (2013.01); *H04L 5/0048* (2013.01); *H04W 72/0446* (2013.01)

(58) Field of Classification Search
CPC .......................... H04W 72/0413; H04L 5/0048
See application file for complete search history.

(56) References Cited

U.S. PATENT DOCUMENTS

| 2011/0205994 A1* | 8/2011 | Han | H04L 1/0668 |
| | | | 370/329 |
| 2012/0093090 A1* | 4/2012 | Han | H04L 27/2615 |
| | | | 370/328 |
| 2012/0113831 A1* | 5/2012 | Pelletier | H04L 5/0058 |
| | | | 370/252 |

(Continued)

FOREIGN PATENT DOCUMENTS

| CN | 102098086 A | 6/2011 |
| CN | 102223726 A | 10/2011 |
| EP | 2660992 A1 | 11/2013 |

OTHER PUBLICATIONS

The EESR of corresponding European application No. 17913425.9, dated Mar. 20, 2020.

(Continued)

*Primary Examiner* — Erika A Washington

(57) ABSTRACT

The present disclosure discloses a channel transmission method, a terminal device and a network device. The method includes: receiving, by a terminal device, first information transmitted by a network device at a first moment; and determining, by the terminal device, a first time domain resource for transmitting a first uplink channel according to the first information, where the first time domain resource is located in a target time domain resource unit, the first time domain resource includes P channel resource units, each of the P channel resource units includes M time domain symbols, and the last N time domain symbols of the M time domain symbols are used to transmit a reference signal.

15 Claims, 7 Drawing Sheets

300

The terminal device determines to transmit a second uplink channel or signal on a third time domain resource in the target time domain resource unit according to the second information, where the third time domain resource at least partially overlaps with the first time domain resource — S341

The terminal device determines a time domain resource in the first time domain resource that does not overlap with the third time domain resource as the second time domain resource — S342

(56) References Cited

U.S. PATENT DOCUMENTS

2014/0169326 A1    6/2014  Levanen et al.
2017/0041829 A1*   2/2017  Dai .................... H04W 28/06

OTHER PUBLICATIONS

LG Electronics:"Design of short duration NR-PUCCH format", 3GPP Draft; R1-1700504 Design of Short Duration NR-PUCCH Format_Final, 3rd Generation Partnership Project (3GPP) vol. RAN WG1, No. Spokane, USA; 20170116-20170120 Jan. 16, 2017(Jan. 16, 2017), XP051208035.
Erisson:"On Short PUCCH with Simultaneous Data Transmission", 3GPP DRAFT; R1-1709090, 3rd Generation Partnership Project (3GPP), vol. RAN WG1, No. Hangzhou, China; 20170515-20170519 May 14, 2017(May 14, 2017), XP051274248.
ZTE:"Long PUCCH-1/2 bits UCI", 3GPP Draft; R1-1707170 Long PUCCH- 1-2 Bits UCI, 3rd Generation Partnership Project (3GPP), vol. RAN WG1, No. Hangzhou; 20170515-20170519 May 14, 2017(May 14, 2017), XP051272385.

* cited by examiner

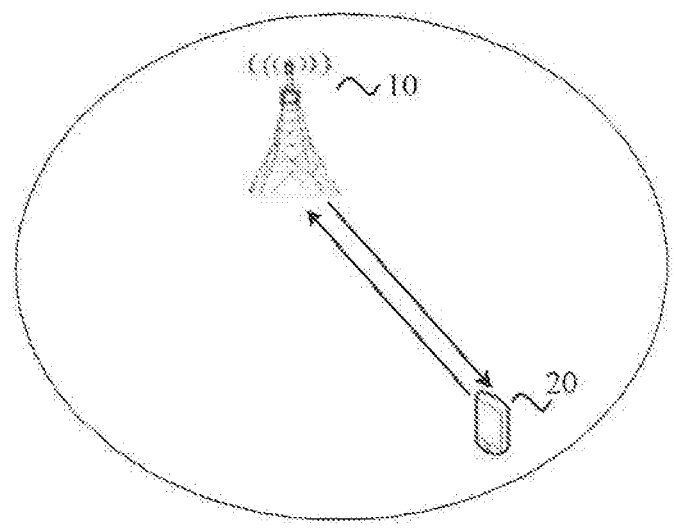
FIG. 1
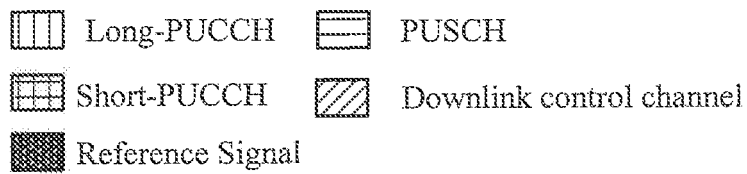
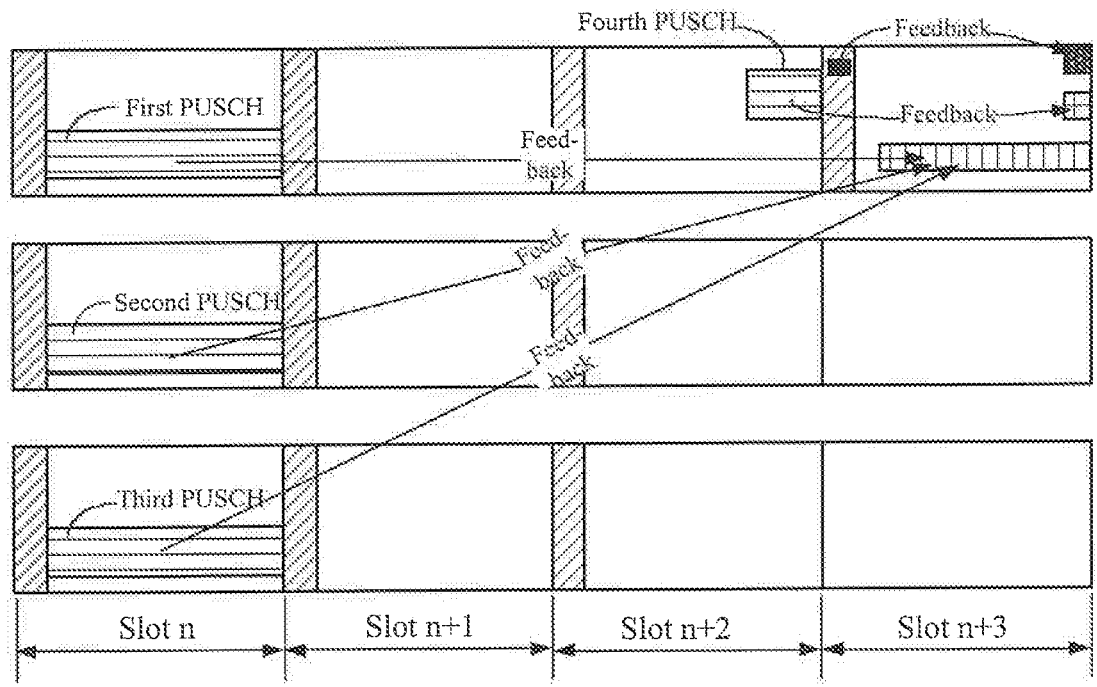
FIG. 2

300

S310
A terminal device receives first information transmitted by a network device at a first moment The terminal device determines a first time domain resource for transmitting a first uplink channel according to the first information, where the first time domain resource is located in a target time domain resource unit, the first time domain resource includes P channel resource units, each channel resource unit includes M time domain symbols, and last N time domain symbols of the M time domain symbols are used to transmit a reference signal, where P, M, and N are positive integers, and N is not greater than M, where the target time domain resource unit includes a slot, a subframe or a frame
S320

FIG. 3

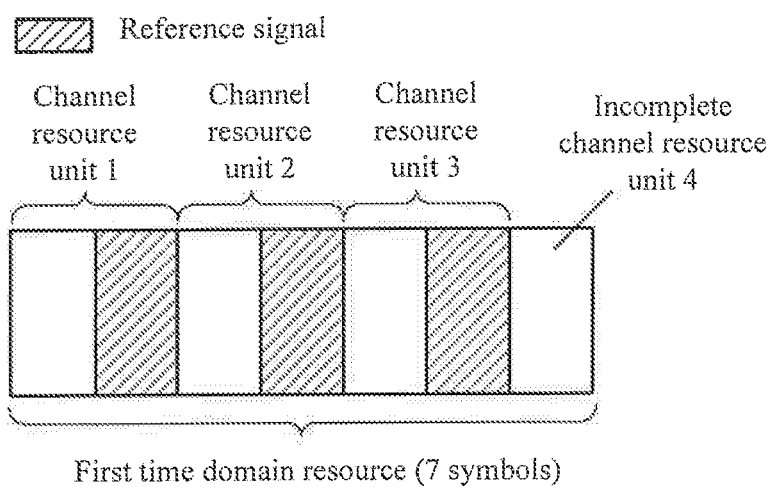

A network device transmits first information to a terminal device at a first moment, enabling the terminal device to determine a first time domain resource for transmitting a first uplink channel according to the first information, where the first time domain resource is located in a target time domain resource unit, the first time domain resource includes P channel resource units, the channel resource unit includes M time domain symbols, and last N time domain symbols of the M time domain symbols are used to transmit a reference signal  — S910

The network device transmits second information to the terminal device at a second moment, enabling the terminal device to determine a second time domain resource for transmitting the first uplink channel according to the second information, where the second moment is after the first moment, the second time domain resource is located in the target time domain resource unit and the first time domain resource includes the second time domain resource  — S920

The network device receives on the second time domain resource the first uplink channel transmitted by the terminal device  — S930

FIG. 9

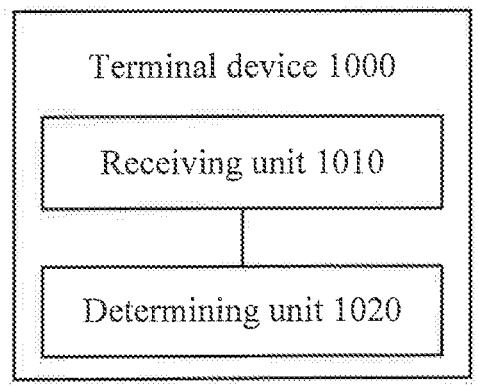

FIG. 10

CHANNEL TRANSMISSION METHOD, TERMINAL DEVICE AND NETWORK DEVICE

CROSS-REFERENCE TO RELATED APPLICATIONS

This application is a continuation of the International Application No. PCT/CN2017/088806, filed on Jun. 16, 2017, entitled "CHANNEL TRANSMISSION METHOD, TERMINAL DEVICE AND NETWORK DEVICE", the content of which is incorporated herein by reference in its entirety.

TECHNICAL FIELD

Embodiments of the present disclosure relate to the field of wireless communications, and more particularly, to a channel transmission method, a terminal device and a network device.

BACKGROUND

In a 5G system or a new radio system, two different lengths of physical uplink control channels (PUCCH) are supported, that is, a short-PUCCH and a long-PUCCH. The short-PUCCH usually includes 1 time domain symbol or 2 time domain symbols, and the long-PUCCH usually includes 4 to 14 time domain symbols.

The delay of a feedback from a terminal device for different service data may be different, and the lengths of PUCCHs used may also be different. Therefore, the same terminal device may need to transmit both of a short-PUCCH and a long-PUCCH in the same time domain resource unit, for example, a slot. If the terminal device does not support transmitting multiple uplink channels and/or uplink signals simultaneously in a symbol, it becomes an urgent problem to be solved that how to perform uplink transmission for the terminal device when a conflict occurs in the time domain between a short-PUCCH and a long-PUCCH in a time domain resource unit.

SUMMARY

Embodiments of the present disclosure provide a channel transmission method, a terminal device and a network device. When a conflict occurs between uplink control information transmitted by the terminal device on a time domain resource, control information can still be effectively transmitted.

A first aspect provides a channel transmission method, including: receiving, by a terminal device, first information transmitted by a network device at a first moment; and determining, by the terminal device, a first time domain resource for transmitting a first uplink channel according to the first information, where the first time domain resource is located in a target time domain resource unit, the first time domain resource includes P channel resource units, each of the P channel resource units includes M time domain symbols, and last N time domain symbols of the M time domain symbols are used to transmit a reference signal, where P, M, and N are positive integers, and N is not greater than M.

Since the last N symbols of the M time domain symbols of each channel resource unit are used to transmit the reference signal, information in each channel resource unit transmitting the first uplink channel can be demodulated separately. When transmission of two pieces of control information is affected by a resource conflict, the network device can also effectively demodulate received channels to ensure efficient transmission of control channels.

In a possible implementation manner, the method further includes: receiving, by the terminal device, second information transmitted by the network device at a second moment; determining, by the terminal device, a second time domain resource for transmitting the first uplink channel according to the second information, where the second moment is after the first moment, the second time domain resource is located in the target time domain resource unit and the first time domain resource includes the second time domain resource; and transmitting, by the terminal device, the first uplink channel to the network device on the second time domain resource.

In a possible implementation manner, the determining, by the terminal device, a second time domain resource for transmitting the first uplink channel according to the second information includes: determining, by the terminal device, to transmit a second uplink channel or signal on a third time domain resource in the target time domain resource unit according to the second information, where the third time domain resource at least partially overlaps with the first time domain resource; and determining, by the terminal device, a time domain resource in the first time domain resource that does not overlap with the third time domain resource as the second time domain resource.

Since each channel resource unit in the second time domain resource includes a resource for transmitting a reference signal, a content of the first uplink channel received by the network device on the second time domain resource can be correctly demodulated. Even if the first uplink channel on the time domain resource in the first time domain resource that overlaps with the third time domain resource is no longer transmitted, no influence can be brought on the transmission of the first uplink channel on the second time domain resource. And the second uplink channel or signal can also be transmitted on the third time domain resource without being affected by the first uplink channel, thereby ensuring effective transmission of control channels.

In a possible implementation manner, the first time domain resource includes the P channel resource units and an incomplete channel resource unit.

In a possible implementation manner, the incomplete channel resource unit is located at an end of the first time domain resource.

In a possible implementation manner, the incomplete channel resource unit includes the first K1 symbols of a first channel resource unit, a structure of the first channel resource unit and a structure of each of the P channel resource units are the same, and K1 is a positive integer smaller than M.

In a possible implementation manner, the second time domain resource includes Q channel resource units, Q is a positive integer and Q is less than or equal to P.

In a possible implementation manner, the second time domain resource occupies the first K2 time domain symbols in the first time domain resource, and K2 is a positive integer.

In a possible implementation manner, the $(i+1)^{th}$ channel resource unit and the channel resource unit of the P channel resource units are adjacent in a time domain, i being from 1 to P-1.

In a possible implementation manner, before determining, by the terminal device, according to the second information that is transmitted by the network device received at the second moment, the second time domain resource for transmitting the first uplink channel, the method further includes: receiving, by the terminal device, configuration information transmitted by the network device, where the configuration information is used to indicate that the terminal device is enabled to adjust a time domain resource for transmitting the first uplink channel.

In a possible implementation manner, the target time domain resource unit includes a slot, a subframe, or a frame.

A second aspect provides a channel transmission method, including: transmitting, by a network device, first information to a terminal device at a first moment, enabling the terminal device to determine a first time domain resource for transmitting a first uplink channel according to the first information, where, the first time domain resource is located in a target time domain resource unit, the first time domain resource includes P channel resource units, each of the P channel resource units includes M time domain symbols, and the last N time domain symbols of the M time domain symbols are used to transmit a reference signal, where P, M, and N are positive integers, and N is not greater than M; transmitting, by the network device, second information to the terminal device at a second moment, enabling the terminal device to determine a second time domain resource for transmitting the first uplink channel according to the second information, where the second moment is after the first moment, the second time domain resource is located in the target time domain resource unit and the first time domain resource includes the second time domain resource; and receiving, by the network device on the second time domain resource, the first uplink channel transmitted by the terminal device.

Since the last N symbols of the M time domain symbols of each channel resource unit are used to transmit the reference signal, information in each channel resource unit transmitting the first uplink channel can be demodulated separately. When transmission of two pieces of control information is affected by a resource conflict, the network device can also effectively demodulate received channels to ensure efficient transmission of control channels.

In a possible implementation manner, a third time domain resource in the target time domain resource unit at least partially overlaps with the first time domain resource, the second time domain resource is a time domain resource in the first time domain resource that does not overlap with the third time domain resource, and the third time domain resource is determined by the terminal device according to the second information as a time domain resource for transmitting a second uplink channel or signal.

Since each channel resource unit in the second time domain resource includes a resource for transmitting a reference signal, a content of the first uplink channel received by the network device on the second time domain resource can be correctly demodulated. Even if the first uplink channel on the time domain resource in the first time domain resource that overlaps with the third time domain resource is no longer transmitted, no influence can be brought on the transmission of the first uplink channel on the second time domain resource. And the second uplink channel or signal can also be transmitted on the third time domain resource without being affected by the first uplink channel, thereby ensuring effective transmission of control channels.

In a possible implementation manner, the first time domain resource includes the P channel resource units and an incomplete channel resource unit.

In a possible implementation manner, the incomplete channel resource unit is located at an end of the first time domain resource. In a possible implementation manner, the incomplete channel resource unit includes the first K1 symbols of a first channel resource unit, a structure of the first channel resource unit and a structure of each of the P channel resource units are the same and K1 is a positive integer smaller than M.

In a possible implementation manner, the second time domain resource includes Q channel resource units, Q is a positive integer and Q is less than or equal to P.

In a possible implementation manner, the second time domain resource occupies the first K2 time domain symbols in the first time domain resource, and K2 is a positive integer.

In a possible implementation manner, the $(i+1)^{th}$ channel resource unit and the $i^{th}$ channel resource unit of the P channel resource units are adjacent in a time domain, i being from 1 to P-1.

In a possible implementation manner, before the transmitting, by a network device, first information to a terminal device, the method further includes: transmitting, by the network device, configuration information to the terminal device, where the configuration information is used to indicate that the terminal device is enabled to adjust a time domain resource for transmitting the first uplink channel.

In a possible implementation manner, the target time domain resource unit includes a slot, a subframe, or a frame.

A third aspect provides a terminal device, where the terminal device can perform operations of the terminal device according to the above first aspect or any possible implementation manners of the first aspect. In particular, the terminal device may include a modular unit for performing the operations of the terminal device according to the above first aspect or any possible implementation manner of the first aspect.

A fourth aspect provides a network device is provided, where the network device can perform operations of the network device according to the above second aspect or any possible implementation manners of the second aspect. In particular, the network device may include a modular unit for performing the operations of the network device according to the above second aspect or any possible implementation manner of the second aspect.

A fifth aspect provides a terminal device, where the terminal device includes a processor, a transceiver and a memory. The processor, the transceiver and the memory communicate with each other via an internal connection path. The memory is configured to store instructions, and the processor is configured to execute the instructions stored in the memory. When the processor executes the instructions stored in the memory, the execution causes the terminal device to perform the method according to the first aspect or any possible implementation manner of the first aspect, or the execution causes the terminal device to implement the terminal device according to the third aspect.

A sixth aspect provides a network device, where the network device includes a processor, a transceiver and a memory. The processor, the transceiver and the memory communicate with each other via an internal connection path. The memory is configured to store instructions, and the processor is configured to execute the instructions stored in the memory. When the processor executes the instructions stored in the memory, the execution causes the network device to perform the method according to the second aspect or any possible implementation manner of the second aspect, or the execution causes the network device to implement the network device according to the fourth aspect.

A seventh aspect provides a computer readable storage medium, where the computer readable storage medium stores a program that causes a terminal device to perform the channel transmission method according to the above first aspect or any possible implementation manner of the first aspect.

An eighth aspect provides a computer readable storage medium, where the computer readable storage medium stores a program that causes a network device to perform the channel transmission method according to the above second aspect or any possible implementation manner of the second aspect.

A ninth aspect provides a system chip, where the system chip includes an input interface, an output interface, a processor and a memory, the processor is configured to execute an instruction stored in the memory, and the instruction, when being executed, causes the processor to implement the method according to the above first aspect or any possible implementation manner of the first aspect.

A tenth aspect provides a system chip, where the system chip includes an input interface, an output interface, a processor and a memory, the processor is configured to execute an instruction stored in the memory, and the instruction, when being executed, causes the processor to implement the method according to the above second aspect or any possible implementation manner of the second aspect.

An eleventh aspect provides a computer program product, where the computer program product includes an instruction, the computer program product, when being run on a computer, causes the computer to perform the method according to the above first aspect or any possible implementation manner of the first aspect.

A twelfth aspect provides a computer program product, where the computer program product includes an instruction, the computer program product, when being run on a computer, causes the computer to perform the method according to the above second aspect or any possible implementation manner of the second aspect.

BRIEF DESCRIPTION OF DRAWINGS

FIG. 1 is a schematic structural diagram of an application scenario according to an embodiment of the present disclosure.

FIG. 2 is a schematic diagram of transmission of an uplink control channel.

FIG. 3 is a schematic flowchart of a channel transmission method according to an embodiment of the present disclosure.

FIG. 4 is a schematic diagram of a channel resource unit according to an embodiment of the present disclosure.

FIG. 9 is a schematic flowchart of a channel transmission method according to an embodiment of the present disclosure.

FIG. 10 is a schematic block diagram of a terminal device according to an embodiment of the present disclosure.

DESCRIPTION OF EMBODIMENTS

Figure 5:
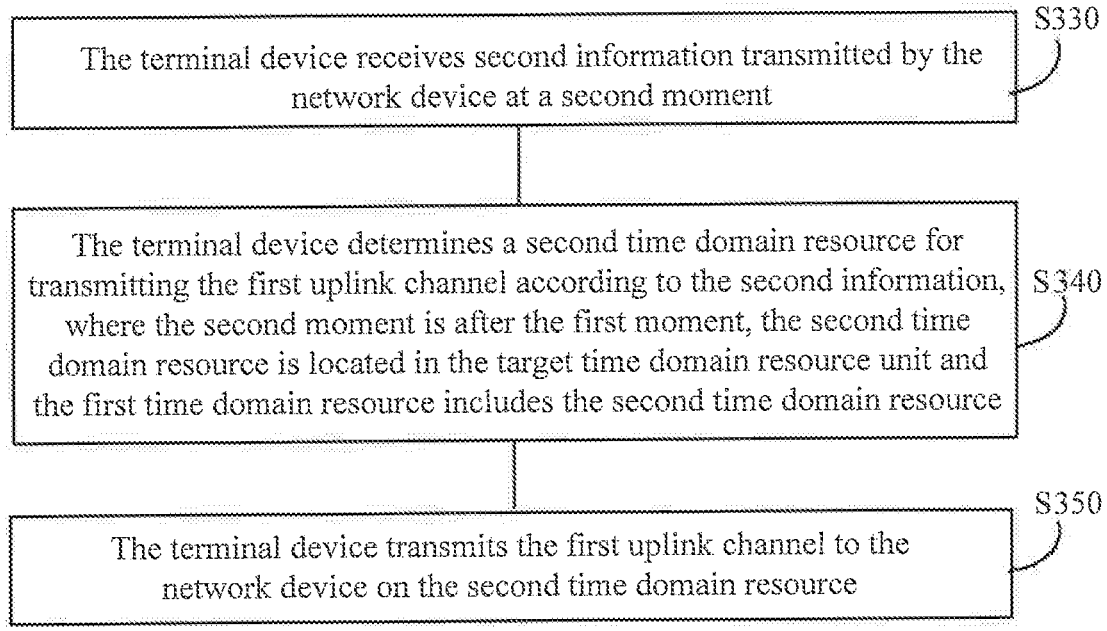
FIG. 5 is a schematic flowchart of a channel transmission method according to an embodiment of the present disclosure.

Technical solutions in embodiments of the present disclosure are described below with reference to the accompanying drawings.

It should be understood that the technical solutions of the embodiments of the present disclosure can be applied to various communication systems, such as a global system of mobile communication (GSM) system, a code division multiple access (CDMA) system, a wideband code division multiple access (WCDMA) system, a general packet radio service (GPRS), a long term evolution (LIE) system, an LTE frequency division duplex (FDD) system, an LTE time division duplex (TDD) system, a universal mobile telecommunication system (UMTS) and a 5G communication system in future, etc.

The present disclosure describes various embodiments in connection with a terminal device. The terminal device may also refer to user equipment (UE), an access terminal, a subscriber unit, a subscriber station, a mobile station, a mobile platform, a remote station, a remote terminal, a mobile device, a user terminal, a terminal, a wireless communication device, a user agent or a user device. The access terminal may be a cellular phone, a cordless phone, a session initiation protocol (SIP) phone, a wireless local loop (WLL) station, a personal digital assistant (PDA), a handheld device with a function of wireless communication, a computing device or another processing device connected to a wireless modem, an in-vehicle device, a wearable device, a terminal device in a future 5G network, or a terminal device in a future evolved public land mobile network (PLMN), etc.

The present disclosure describes various embodiments in connection with a network device. The network device may be a device for communicating with a terminal device, for example, may be a base transceiver station (BTS) in a GSM system or CDMA, or may be a NodeB (NB) in a WCDMA system, or may be an evolutional Node B (eNB eNodeB) in an LTE system, or the network device may be a relay station, an access point, an in-vehicle device, a wearable device, and a network side device in a future 5G network or a future evolved PLMN network, etc.

FIG. 1 is a schematic diagram of an application scenario according to an embodiment of the present disclosure. The communication system in FIG. 1 may include a network device 10 and a terminal device 20. The network device 10 is configured to provide communication services for the terminal device 20 and access a core network. The terminal device 20 can access the network by searching for a synchronization signal, a broadcast signal, and the like transmitted by the network device 10, thereby performing communication with the network. The arrows shown in FIG. 1 may represent uplink/downlink transmission by a cellular link between the terminal device 20 and the network device 10.

The network in the embodiments of the present disclosure may refer to a public land mobile network (PLMN), a device to device (D2D) network, a machine to machine/man (M2M) network or another network. FIG. 1 is simply a simplified schematic diagram of an example. Other terminal devices may also be included in the network, which are not shown in FIG. 1.

In a 5G system, two different lengths of PUCCHs, that is, a short-PUCCH and a long-PUCCH, are supported. The short-PUCCH usually includes 1 time domain symbol or 2 time domain symbols, and the long-PUCCH usually includes 4 to 14 time domain symbols. The delay of an uplink feedback from the terminal device for different service data may be different, and the lengths of PUCCHs used may also be different. Therefore, the same terminal device may need to transmit both of a short-PUCCH and a long-PUCCH in the same time domain resource unit, for example, a slot. If the terminal device does not support transmitting multiple uplink channels and/or uplink signals simultaneously in a symbol, it becomes an urgent problem to be solved that how to perform uplink transmission for the terminal device when a conflict occurs in the time domain between a short-PUCCH and a long-PUCCH in a time domain resource unit.

By way of example, FIG. 2 shows a transmission diagram of the uplink control channel in a slot n+3, the terminal device needs to transmit uplink control information for a first physical uplink shared channel (PUSCH), a second PUSCH, and a third PUSCH, that is, the long-PUCCH shown in FIG. 2, and also needs to transmit uplink control information for a fourth PUSCH, that is, the short-PUCCH shown in FIG. 2 in the slot n+3. The time domain resource occupied by the long-PUCCH overlaps with the time domain resource occupied by the short-PUCCH. If the terminal device does not support transmitting multiple uplink channels and/or uplink signals simultaneously in a symbol, the terminal device cannot determine how to perform uplink transmission when a conflict occurs in the time domain between the short-PUCCH and the long-PUCCH. Similarly, if the terminal device in the slot n+3 needs to transmit both a long-PUCCH and a non-periodic reference signal (RS) scheduled by the network device, and the long-PUCCH and the RS conflict on the time domain resource, the transmission of the uplink control channel of the terminal device will also be affected.

According to an embodiment of the present disclosure, the structure of the uplink channel is designed in such a manner that the time domain resource of the uplink control channel (for example, the long-PUCCH) is allowed to include multiple channel resource units, and each channel resource unit includes M time domain symbols, where the last N symbols of the M time domain symbols are used to transmit a reference signal. In this way, information in each channel resource unit transmitting the uplink channel can be demodulated separately, and when transmission of two pieces of control information is affected by a resource conflict, the network device can also effectively demodulate received channels to ensure efficient transmission of control channels.

FIG. 3 is a schematic flowchart of a channel transmission method according to an embodiment of the present disclosure. The method shown in FIG. 3 may be performed by a terminal device, which can be, for example, the terminal device 20 shown in FIG. 1. As shown in FIG. 3, the channel transmission method includes:

In 310, the terminal device receives first information transmitted by a network device at a first moment.

In 320, the terminal device determines a first time domain resource for transmitting a first uplink channel according to the first information, where the first time domain resource is located in a target time domain resource unit, the first time domain resource includes P channel resource units, each of the P channel resource units includes M time domain symbols, and the last N time domain symbols of the M time domain symbols are used to transmit a reference signal, where P, and N are positive integers, and N is not greater than M, where the target time domain resource unit includes a slot, a subframe or a frame.

Specifically; after receiving the first information, such as a PUSCH, transmitted by the network device at the first moment, the terminal device determines to feed back the first uplink channel, for example, a long-PUCCH, on the first time domain resource in the target time domain resource unit to the network device. The first time domain resource includes multiple, for example, P channel resource units, and each channel resource unit includes M time domain symbols, and the last N time domain symbols of the M time domain symbols are used to transmit a reference signal.

Since the last N symbols of the M time domain symbols of each channel resource unit are used to transmit the reference signal, information in each channel resource unit transmitting the first uplink channel can be demodulated separately. When transmission of two pieces of control information is affected by a resource conflict, the network device can also effectively demodulate received channels to ensure efficient transmission of control channels.

In an implementation, the $(i+1)^{th}$ channel resource unit and the $i^{th}$ channel resource unit of the P channel resource units are adjacent in a time domain, i being from 1 to P-1. That is to say, one channel resource unit is sequentially arranged next to one channel resource unit in time, and time domain symbols in different channel resource units are not interleaved.

In an implementation, the first time domain resource includes the P channel resource units and an incomplete channel resource unit.

In other words, the channel resource units are P complete channel resource units, each channel resource unit includes M time domain symbols, while the incomplete channel resource unit includes simply a part of the NI time domain symbols. That is, the number of time domain symbols in the incomplete channel resource unit is less than M.

In an implementation, the incomplete channel resource unit is located at an end of the first time domain resource.

In other words, the P channel resource units in the first time domain resource occupy the foremost time domain symbols in the first time domain resource.

In an implementation, the incomplete channel resource unit includes the first K1 symbols of a first channel resource unit, a structure of the first channel resource unit and a structure of each of the P channel resource units are the same, and K1 is a positive integer smaller than M.

The first channel resource unit may be understood as a complete channel resource unit having the same structure as the P channel resource units. The first channel resource unit also includes M time domain symbols and N symbols of the M symbols are used to transmit a reference signal, and the first K1 symbols in the first channel resource unit may constitute the incomplete channel resource unit. The P channel resource units and the incomplete channel resource unit form the first time domain resource.

By way of example, FIG. 4 shows a schematic diagram of the P channel resource units in the first time domain resource, where P=3. For a channel resource unit 1, a channel resource unit 2, and a channel resource unit 3, each channel resource unit includes two time domain symbols, and the first symbol is used to transmit control information, while the last symbol is used to transmit a reference signal. Compared with a complete channel resource unit 1, channel resource unit 2 and channel resource unit 3, the incomplete channel resource unit (Partial Unit) 4 includes only one symbol, and the one symbol included in the incomplete channel resource unit 4 is used to transmit uplink information.

In an implementation, as shown in FIG. 5, after 320, the method further includes 330 to 350, where:

In 330, the terminal device receives second information transmitted by the network device at a second moment.

In 340, the terminal device determines a second time domain resource for transmitting the first uplink channel according to the second information, where the second moment is after the first moment, the second time domain resource is located in the target time domain resource unit and the first time domain resource includes the second time domain resource.

In 350, the terminal device transmits the first uplink channel to the network device on the second time domain resource.

Specifically, after the terminal device determines to transmit the first uplink channel to the network device on the first time domain resource in the target time domain resource unit, the terminal device receives the second information that is transmitted by the network device at the second moment, and the terminal device has not transmitted the first uplink channel at the second moment yet. At this time, the terminal device may further re-determine a second time domain resource for transmitting the first uplink channel according to the second information, and transmit the first uplink channel on the second time domain resource to the network.

Figure 6:
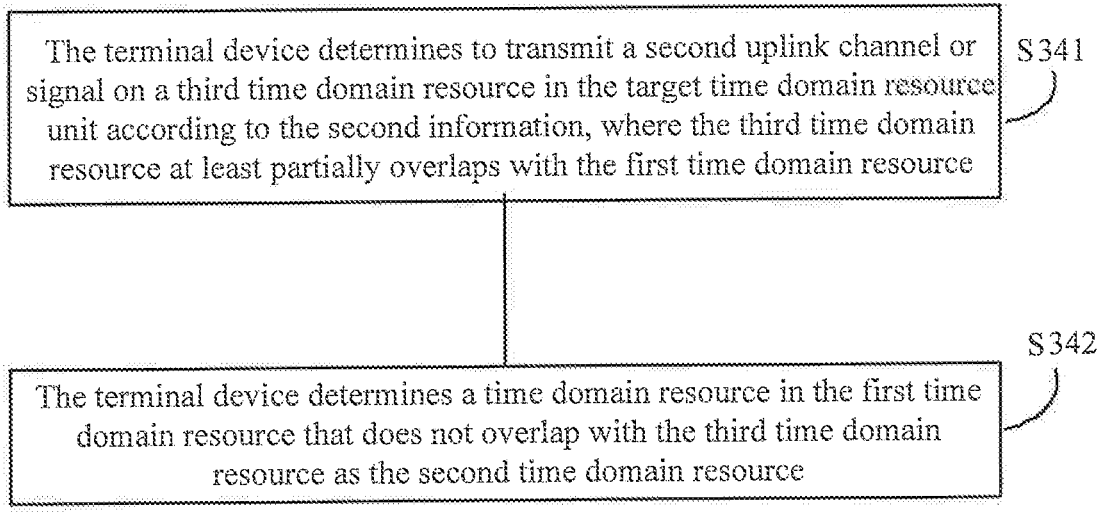
FIG. 6 is a schematic flowchart of a channel transmission method according to an embodiment of the present disclosure.

Alternatively, as shown in FIG. 6, 340 may include 341 and 342, where:

In 341, the terminal device determines to transmit a second uplink channel or signal on a third time domain resource in the target time domain resource unit according to the second information, where the third time domain resource at least partially overlaps with the first time domain resource.

In 342, the terminal device determines a time domain resource in the first time domain resource that does not overlap with the third time domain resource as the second time domain resource.

In the embodiment, after the terminal device receives the second information, such as a PUSCH or downlink control information, the terminal device determines to feed back a second uplink channel (for example, a short-PUCCH) or a signal (for example, a reference signal) to the network device on the third time domain resource in the target time domain resource unit. At this time, if the third time domain resource at least partially overlaps with the first time domain resource, the terminal device will re-determine a time domain resource for transmitting the first uplink channel. The terminal device may determine a time domain resource in the first time domain resource that does not overlap with the third time domain resource as the time domain resource for transmitting the first uplink channel, i.e. the second time domain resource.

It should be understood that the second information may be a second PUSCH or indication information for indicating the terminal device to transmit a non-periodic reference signal or the like.

In an implementation, the second time domain resource includes Q channel resource units, where Q is a positive integer and Q is less than or equal to P. Each channel resource unit includes M time domain symbols, and the last N time domain symbols of the M time domain symbols are used to transmit the reference signal. The Q channel resource units are a subset of the P channel resource units in the first time domain resource, that is, the Q channel resource units are at least part of the P channel resource units.

In an implementation, the second time domain resource occupies the first K2 time domain symbols in the first time domain resource, and K2 is a positive integer.

Figure 7:
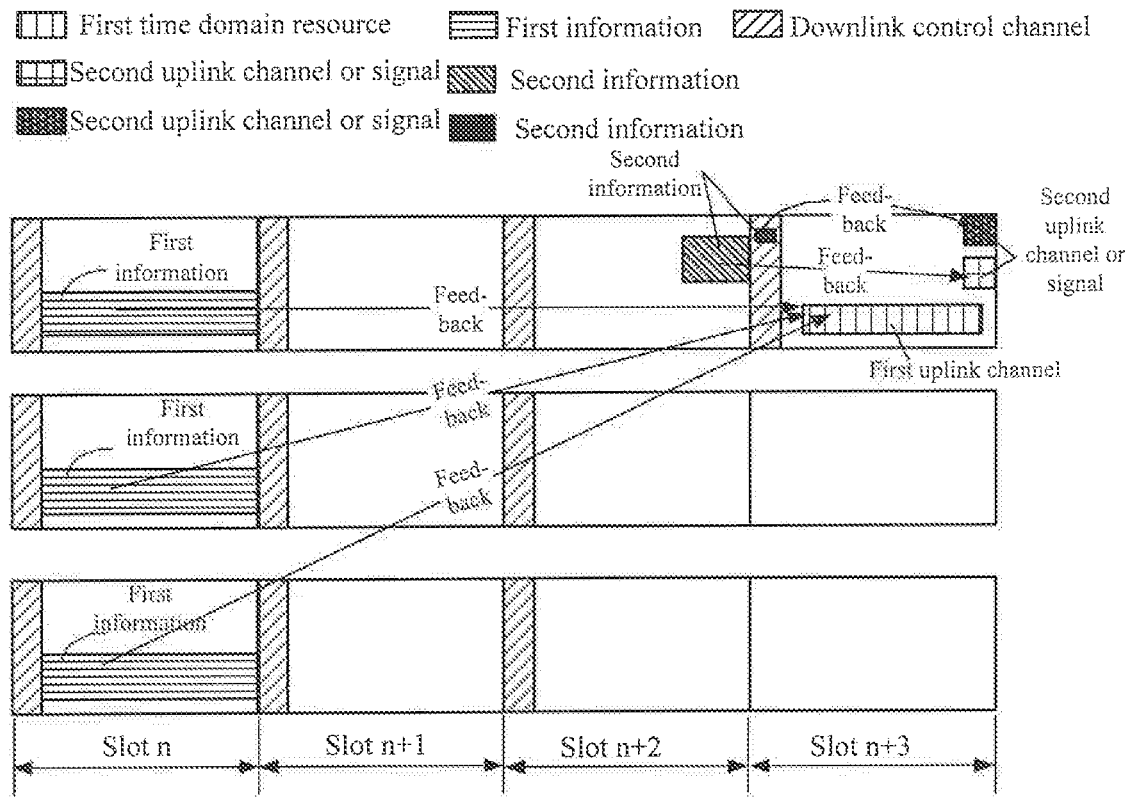
FIG. 7 is a schematic diagram of transmission of an uplink control channel according to an embodiment of the present disclosure.
Figure 8:
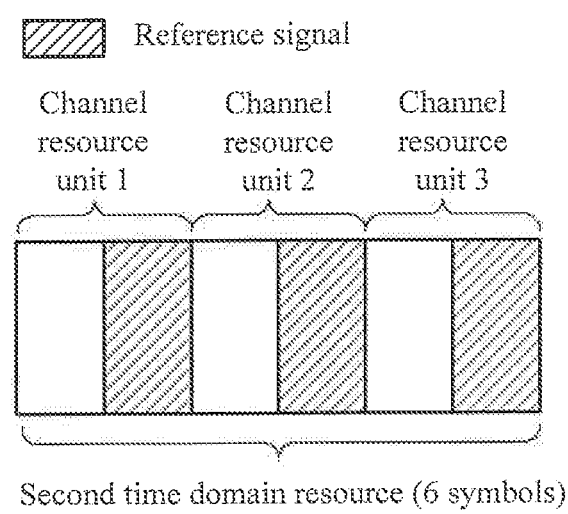
FIG. 8 is a schematic diagram of a time domain resource for transmitting an uplink control channel according to an embodiment of the present disclosure.

For example, as shown in FIG. 7, it is assumed that the last one symbol in the first time domain resource (i.e., the incomplete channel resource unit 4) overlaps with the third time domain resource, where the first time domain resource is as shown in FIG. 4. It can be determined that the time domain resource as shown in FIG. 8 is the second time domain resource for transmitting the first uplink channel. The second time domain resource includes a channel resource unit 1, a channel resource unit 2, and a channel resource unit 3, where each channel resource unit includes two time domain symbols, and the first symbol of each channel resource unit is used to transmit control information, while the last symbol of each channel resource unit is used to transmit a reference signal. The second time domain resource includes the first six symbols of the first time domain resource.

Since each channel resource unit in the second time domain resource includes a resource for transmitting a reference signal, a content of the first uplink channel received by the network device on the second time domain resource can be correctly demodulated. Even if the first uplink channel on the time domain resource in the first time domain resource that overlaps with the third time domain resource is no longer transmitted, no influence can be brought on the transmission of the first uplink channel on the second time domain resource. And the second uplink channel or signal can also be transmitted on the third time domain resource without being affected by the first uplink channel, thereby ensuring effective transmission of control channels.

In an implementation, before. 340, that is, before the terminal device determines the second time domain resource for transmitting the first uplink channel according to the second information, the method further includes: the terminal device receives configuration information transmitted by the network device, where the configuration information is used to indicate that the terminal device is enabled to adjust a time domain resource for transmitting the first uplink channel.

That is, the configuration information is used to indicate that, after receiving the second information, the terminal device can further re-determine, according to the second information, a time domain resource for transmitting the first uplink channel, that is, the second time domain resource.

FIG. 9 is a schematic flowchart of a channel transmission method according to an embodiment of the present disclosure. The method illustrated in FIG. 9 may be performed by a network device, such as network device 10 shown in FIG. 1. As shown in FIG. 9, the channel transmission method includes:

In 910, the network device transmits first information to a terminal device at a first moment, enabling the terminal device to determine a first time domain resource for transmitting a first uplink channel according to the first information, where the first time domain resource is located in a target time domain resource unit, the first time domain resource includes P channel resource units, each of the P channel resource units includes M time domain symbols, and the last N time domain symbols of the M time domain symbols are used to transmit a reference signal, where P, M, and N are positive integers, and N is not greater than M.

In 920, the network device transmits second information to the terminal device at a second moment, enabling the terminal device to determine a second time domain resource for transmitting the first uplink channel according to the second information, where the second moment is after the first moment, the second time domain resource is located in the target time domain resource unit and the first time domain resource includes the second time domain resource.

In 930, the network device receives on the second time domain resource the first uplink channel transmitted by the terminal device.

Specifically, the network device transmits the first information, for example, a first PUSCH, to the terminal device, where the terminal device determines, according to the first information, to feed back the first uplink channel, for example, a long-PUCCH, on the first time domain resource in the target time domain resource unit to the network device. The network device transmits the second information to the terminal device at the second moment, and the terminal device has not transmitted the first uplink channel at the second moment. At this time, the terminal device may further re-determine a second time domain resource for transmitting the first uplink channel according to the second information, and transmit the first uplink channel on the second time domain resource to the network, so that the network device receives the first uplink channel that is transmitted by the terminal device on the second time domain resource. The first time domain resource includes multiple, for example, P channel resource units, and each of the channel resource units includes M time domain symbols, where the last N time domain symbols of the M time domain symbols are used to transmit a reference signal. The target time domain resource unit is, for example, a slot, a subframe or a frame.

Since the last N symbols of the M time domain symbols of each channel resource unit are used to transmit the reference signal, information in each channel resource unit transmitting the first uplink channel can be demodulated separately. When transmission of two pieces of control information is affected by a resource conflict, the network device can also effectively demodulate received channels to ensure efficient transmission of control channels.

In an implementation, the $(i+1)^{th}$ channel resource unit and the $i^{th}$ channel resource unit of the P channel resource units are adjacent in a time domain, i being from 1 to P-1. That is to say; one channel resource unit is sequentially arranged next to one channel resource unit in time, and time domain symbols in different channel resource units are not interleaved.

In an implementation, the first time domain resource includes the P channel resource units and an incomplete channel resource unit.

In other words, the P channel resource units are P complete channel resource units, each channel resource unit includes M time domain symbols, while the incomplete channel resource unit includes simply a part of the M time domain symbols. That is, the number of time domain symbols in the incomplete channel resource unit is less than M.

In an implementation, the incomplete channel resource unit is located at an end of the first time domain resource.

In other words, the P channel resource units in the first time domain resource occupy the foremost time domain symbols in the first time domain resource.

In an implementation, the incomplete channel resource unit includes the first K1 symbols of a first channel resource unit, a structure of the first channel resource unit and a structure of each of the P channel resource units are the same, and K1 is a positive integer smaller than M.

By way of example, FIG. 4 shows a schematic diagram of the P channel resource units in the first time domain resource. For a channel resource unit 1, a channel resource unit 2, and a channel resource unit 3, each channel resource unit includes two time domain symbols, and the first symbol is used to transmit control information, while the last symbol is used to transmit a reference signal. Compared with the channel resource unit 1, channel resource unit 2 and channel resource unit 3, the incomplete channel resource unit (Partial Unit) 4 includes only one symbol.

In an implementation, a third time domain resource in the target time domain resource unit at least partially overlaps with the first time domain resource, the second time domain resource is a time domain resource in the first time domain resource that does not overlap with the third time domain resource, and the third time domain resource is determined by the terminal device according to the second information as a time domain resource for transmitting a second uplink channel or signal.

It should be understood that the second information may be a second PUSCH or indication information for indicating the terminal device to transmit a non-periodic reference signal.

Since each channel resource unit in the second time domain resource includes a resource for transmitting a reference signal, a content of the first uplink channel received by the network device on the second time domain resource can be correctly demodulated. Even if the first uplink channel on the time domain resource in the first time domain resource that overlaps with the third time domain resource is no longer transmitted, no influence can be brought on the transmission of the first uplink channel on the second time domain resource. And the second uplink channel or signal can also be transmitted on the third time domain resource without being affected by the first uplink channel, thereby ensuring effective transmission of control channels.

In an implementation, the second time domain resource includes Q channel resource units, where Q is a positive integer and Q is less than or equal to P. Each of the Q channel resource units includes M time domain symbols, and the last N time domain symbols of the M time domain symbols are used to transmit the reference signal. The Q channel resource units are a subset of the P channel resource units in the first time domain resource, that is, the Q channel resource units are at least part of the P channel resource units.

In an implementation, the second time domain resource occupies the first K2 time domain symbols in the first time domain resource, and K2 is a positive integer.

For example, as shown in FIG. 7, it is assumed that the last one symbol in the first time domain resource (i.e., the incomplete channel resource unit 4) overlaps with the third time domain resource, where the first time domain resource is as shown in FIG. 4, it can be determined that the time domain resource as shown in FIG. 8 is the second time domain resource for transmitting the first uplink channel. The second time domain resource includes a channel resource unit 1, a channel resource unit 2, and a channel resource unit 3, where each channel resource unit includes two time domain symbols, and the first symbol of each channel resource unit is used to transmit control information, while the last symbol is used to transmit a reference signal. The second time domain resource includes the first six symbols of the first time domain resource.

In an implementation, before 910, that is, before the network device transmits the first information to the terminal device at the first moment, the method further includes: the network device transmits configuration information to the terminal device, where the configuration information is used to indicate that the terminal device is enabled to adjust a time domain resource for transmitting the first uplink channel.

That is, the configuration information is used to indicate that after receiving the second information, the terminal device can further re-determine, according to the second information, a time domain resource for transmitting the first uplink channel, that is, the second time domain resource.

It should be understood that, in the embodiments of the present disclosure, the order of sequence numbers of the foregoing processes does not mean the order of execution sequence, the order of execution sequence of each process should be determined according to its function and internal logic, and should not construed as limiting the implementation of the embodiments of the present disclosure.

FIG. 10 is a schematic block diagram of a terminal device 1000 according to an embodiment of the present disclosure. As shown in FIG. 10, the terminal device 1000 includes a receiving unit 1010 and a determining unit 1020, where:

the receiving unit 1010 is configured to receive first information transmitted by a network device at a first moment;

the determining unit 1020 is configured to determine a first time domain resource for transmitting a first uplink channel according to the first information received by the receiving unit 1010, where the first time domain resource is located in the target time domain resource unit, the first time domain resource includes P channel resource units, each of the P channel resource units includes M time domain symbols, and the last N time domain symbols of the M time domain symbols are used to transmit a reference signal, where P, M, and N are positive integers, and N is not greater than M.

Since the last N symbols of the M time domain symbols of each channel resource unit are used to transmit the reference signal, information in each channel resource unit transmitting the first uplink channel can be demodulated separately. When transmission of two pieces of control information is affected by a resource conflict, the network device can also effectively demodulate received channels to ensure efficient transmission of control channels.

In an implementation, the terminal device further includes a transmitting unit, where the receiving unit 1010 is further configured to receive second information transmitted by the network device at a second moment; the determining unit 1020 is further configured to determine a second time domain resource for transmitting the first uplink channel according to the second information, where the second moment is after the first moment, the second time domain resource is located in the target time domain resource unit and the first time domain resource includes the second time domain resource; and the transmitting unit is configured to transmit the first uplink channel to the network device on the second time domain resource.

In an implementation, the determining unit 1020 is specifically configured to determine to transmit a second uplink channel or signal on a third time domain resource in the target time domain resource unit according to the second information, where the third time domain resource at least partially overlaps with the first time domain resource; and determine a time domain resource in the first time domain resource that does not overlap with the third time domain resource as the second time domain resource.

In an implementation, the first time domain resource includes the P channel resource units and an incomplete channel resource unit.

In an implementation, the incomplete channel resource unit is located at an end of the first time domain resource.

In an implementation, the incomplete channel resource unit includes the first K1 symbols of a first channel resource unit, a structure of the first channel resource unit and a structure of each of the P channel resource units are the same, and K1 is a positive integer smaller than M.

In an implementation, the second time domain resource includes Q channel resource units, Q is a positive integer and Q is less than or equal to P.

In an implementation, the second time domain resource occupies the first K2 time domain symbols in the first time domain resource, and K2 is a positive integer.

In an implementation, the $(i+1)^{th}$ channel resource unit and the $i^{th}$ channel resource unit of the P channel resource units are adjacent in a time domain, i being from 1 to P-1.

In an implementation, the receiving unit 1010 is further configured to receive configuration information transmitted by the network device, where the configuration information is used to indicate that the terminal device is enabled to adjust a time domain resource for transmitting the first uplink channel.

In an implementation, the target time domain resource unit includes a slot, a subframe or a frame.

Figure 11:
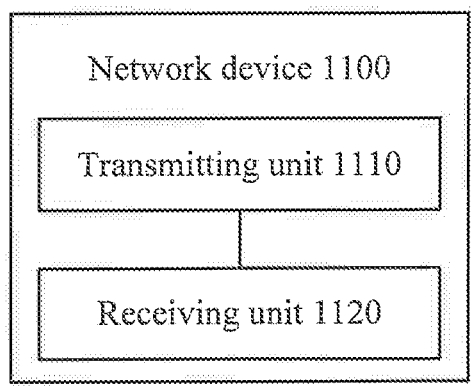
FIG. 11 is a schematic block diagram of a network device according to an embodiment of the present disclosure.

FIG. 11 is a schematic block diagram of a network device 1100 according to an embodiment of the present disclosure. As shown in FIG. 11, the network device 1100 includes a transmitting unit 1110 and a receiving unit 1120, where:

the transmitting unit 1110 is configured to transmit first information to a terminal device at a first moment, enabling the terminal device to determine a first time domain resource for transmitting a first uplink channel according to the first information, where the first time domain resource is located in the target time domain resource unit, the first time domain resource includes P channel resource units, the channel resource unit includes M time domain symbols, and the last N time domain symbols of the M time domain symbols are used to transmit a reference signal, where P, M, and N are positive integers, and N is not greater than M;

the transmitting unit 1110 is further configured to transmit second information to the terminal device at a second moment, enabling the terminal device to determine a second time domain resource for transmitting the first uplink channel according to the second information, where the second moment is after the first moment, the second time domain resource is located in the target time domain resource unit and the first time domain resource includes the second time domain resource; and the receiving unit 1120 is configured to receive on the second time domain resource the first uplink channel transmitted by the terminal device.

Since the last N symbols of the M time domain symbols of each channel resource unit are used to transmit the reference signal, information in each channel resource unit transmitting the first uplink channel can be demodulated separately. When transmission of two pieces of control information is affected by a resource conflict, the network device can also effectively demodulate received channels to ensure efficient transmission of control channels.

In an implementation, a third time domain resource in the target time domain resource unit at least partially overlaps with the first time domain resource, the second time domain resource is a time domain resource in the first time domain resource that does not overlap with the third time domain resource, and the third time domain resource is determined by the terminal device according to the second information as a time domain resource for transmitting a second uplink channel or signal.

Since each channel resource unit in the second time domain resource includes a resource for transmitting a reference signal, a content of the first uplink channel received by the network device on the second time domain resource can be correctly demodulated. Even if die first uplink channel on the time domain resource in the first time domain resource that overlaps with the third time domain resource is no longer transmitted, no influence can be brought on the transmission of the first uplink channel on the second time domain resource. And the second uplink channel or signal can also be transmitted on the third time domain resource without being affected by the first uplink channel, thereby ensuring effective transmission of control channels.

In an implementation, the first time domain resource includes the P channel resource units and an incomplete channel resource unit.

In an implementation, the incomplete channel resource unit is located at an end of the first time domain resource.

In an implementation, the incomplete channel resource unit includes the first K1 symbols of a first channel resource unit, a structure of the first channel resource unit and a structure of each of the P channel resource units are the same, and K1 is a positive integer smaller than M.

In an implementation, the second time domain resource includes Q channel resource units, Q is a positive integer and Q is less than or equal to P.

In an implementation, the second time domain resource occupies the first K2 time domain symbols in the first time domain resource, and 112 is a positive integer.

In an implementation, the $(i+1)^{th}$ channel resource unit and the channel resource unit of the P channel resource units are adjacent in a time domain, i being from 1 to P-1.

In an implementation, the transmitting unit 1110 is further configured to transmit configuration information to the terminal device, where the configuration information is used to indicate that the terminal device is enabled to adjust a time domain resource for transmitting the first uplink channel.

In an implementation, the target time domain resource unit includes a slot, a subframe or a frame.

Figure 12:
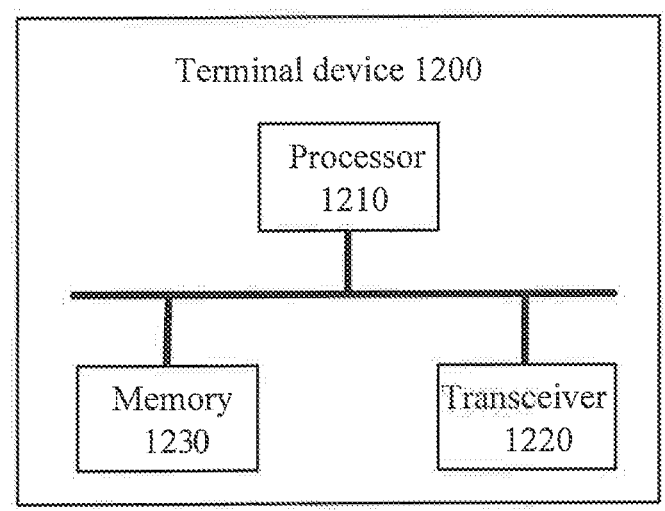
FIG. 12 is a schematic structural diagram of a terminal device according to an embodiment of the present disclosure.

FIG. 12 is a schematic structural diagram of a terminal device 1200 according to an embodiment of the present disclosure. As shown in FIG. 12, the terminal device includes a processor 1210, a transceiver 1220, and a memory 1230, where the processor 1210, the transceiver 1220, and the memory 1230 communicate with each other via an internal connection path. The memory 1230 is configured to store instructions, the processor 1210 is configured to execute the instructions stored in the memory 1230 to control the transceiver 1220 to receive or transmit a signal. The transceiver 1220 is configured to:

receive first information transmitted by a network device at a first moment;

the processor 1210 is configured to determine a first time domain resource for transmitting a first uplink channel according to the first information received by the transceiver 1220, where the first time domain resource is located in the target time domain resource unit, the first time domain resource includes P channel resource units, each of the P channel resource units includes M time domain symbols, and the last N time domain symbols of the M time domain symbols are used to transmit a reference signal, where P, M, and N are positive integers, and N is not greater than M.

Since the last N symbols of the M time domain symbols of each channel resource unit are used to transmit the reference signal, information in each channel resource unit transmitting the first uplink channel can be demodulated separately. When transmission of two pieces of control information is affected by a resource conflict, the network device can also effectively demodulate received channels to ensure efficient transmission of control channels.

In an implementation, the transceiver 1220 is further configured to receive second information transmitted by the network device at a second moment; the processor 1210 is further configured to determine a second time domain resource for transmitting the first uplink channel according to the second information, where the second moment is after the first moment, the second time domain resource is located in the target time domain resource unit and the first time domain resource includes the second time domain resource; and the transceiver 1220 is configured to transmit the first uplink channel to the network device on the second time domain resource.

In an implementation, the processor 1210 is specifically configured to determine to transmit a second uplink channel or signal on a third time domain resource in the target time domain resource unit according to the second information, where the third time domain resource at least partially overlaps with the first time domain resource; and determine a time domain resource in the first time domain resource that does not overlap with the third time domain resource as the second time domain resource.

In an implementation, the first time domain resource includes the P channel resource units and an incomplete channel resource unit.

In an implementation, the incomplete channel resource unit is located at an end of the first time domain resource.

In an implementation, the incomplete channel resource unit includes the first K1 symbols of a first channel resource unit, a structure of the first channel resource unit and a structure of each of the P channel resource units are the same, and K1 is a positive integer smaller than M.

In an implementation, the second time domain resource includes Q channel resource units, Q is a positive integer and Q is less than or equal to P.

In an implementation, the second time domain resource occupies the first K2, time domain symbols in the first time domain resource, and K2 is a positive integer.

In an implementation, the $(i+1)^{th}$ channel resource unit and the $i^{th}$ channel resource unit of the P channel resource units are adjacent in a time domain, i being from 1 to P-1.

In an implementation, the transceiver 1220 is further configured to receive configuration information transmitted by the network device, where the configuration information is used to indicate that the terminal device is enabled to adjust a time domain resource for transmitting the first uplink channel.

In an implementation, the target time domain resource unit includes a slot, a subframe or a frame.

It should be understood that, in the embodiment of the present disclosure, the processor 1210 may be a central processing unit (CPU), and the processor 1210 may also be another general-purpose processor, a digital signal processor (DSP), an application specific integrated circuit (ASIC), a field programmable gate array (FPGA) or another programmable logic device, a discrete gate or a transistor logic device, a discrete hardware component, etc. The general purpose processor may be a microprocessor or the processor may be any conventional processor or the like.

The memory 1230 can include a read only memory and a random access memory and provides instructions and data to the processor 1210. A portion of the memory 1230 can also include a non-volatile random access memory.

In an implementation process, each step in the above method may be performed by an integrated logic circuit of hardware in the processor 1210 or an instruction in the form of software. The steps of the channel transmission method disclosed in the embodiments of the present disclosure may be directly implemented by the hardware processor, or may be performed by a combination of hardware and software modules in the processor 1210. The software module can be located in a conventional storage medium such as a random access memory, a flash memory, a read only memory, a programmable read only memory or an electrically erasable programmable memory, a register, and the like. The storage medium is located in the memory 1230. The processor 1210 reads information in the memory 1230 and, in conjunction with its hardware, performs the steps in the above method. To avoid repetition, it will not be described in detail herein.

The terminal device 1200 according to the embodiment of the present disclosure may correspond to the terminal device for performing the method 400 in the foregoing method 400, and the terminal device 1000 according to the embodiment of the present disclosure, where each unit or module in the terminal device 1200 is configured to perform operations or processes performed by the terminal device in the above method 400. To avoid repetition, it will not be described in detail herein.

Figure 13:
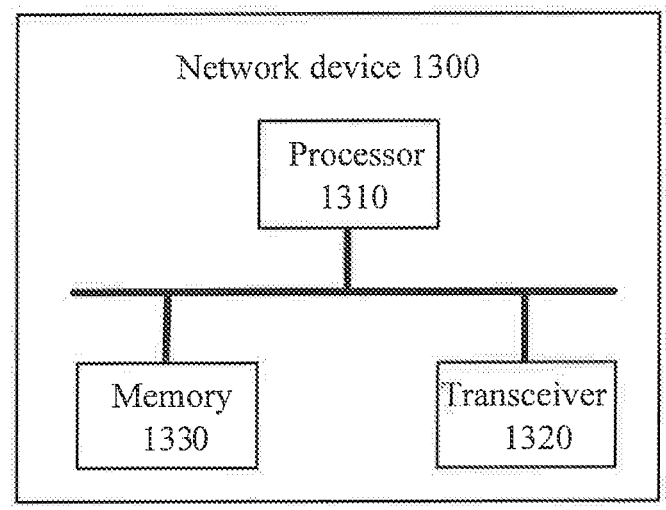
FIG. 13 is a schematic structural diagram of a network device according to an embodiment of the present disclosure.

FIG. 13 is a schematic structural diagram of a network device 1300 according to an embodiment of the present disclosure. As shown in FIG. 13, the network device includes a processor 1310, a transceiver 1320, and a memory 1330, where the processor 1310, the transceiver 1320, and the memory 1330 communicate with each other via an internal connection path. The memory 1330 is configured to store instructions, the processor 1310 is configured to execute the instructions stored in the memory 1330 to control the transceiver 1320 to receive or transmit a signal. The transceiver 1320 is configured to:

transmit first information to a terminal device at a first moment, enabling the terminal device to determine a first time domain resource for transmitting a first uplink channel according to the first information, where the first time domain resource is located in the target time domain resource unit, the first time domain resource includes P channel resource units, the channel resource unit includes M time domain symbols, and the last N time domain symbols of the M time domain symbols are used to transmit a reference signal, where P, M, and N are positive integers, and N is not greater than M;

transmit second information to the terminal device at a second moment, enabling the terminal device to determine a second time domain resource for transmitting the first uplink channel according to the second information, where the second moment is after the first moment, the second time domain resource is located in the target time domain resource unit and the first time domain resource includes the second time domain resource; and receive on the second time domain resource the first uplink channel transmitted by the terminal device.

Since the last N symbols of the M time domain symbols of each channel resource unit are used to transmit the reference signal, information in each channel resource unit transmitting the first uplink channel can be demodulated separately. When transmission of two pieces of control information is affected by a resource conflict, the network device can also effectively demodulate received channels to ensure efficient transmission of control channels.

In an implementation, a third time domain resource in the target time domain resource unit at least partially overlaps with the first time domain resource, the second time domain resource is a time domain resource in the first time domain resource that does not overlap with the third time domain resource, and the third time domain resource is determined by the terminal device according to the second information as a time domain resource for transmitting a second uplink channel or signal.

Since each channel resource unit in the second time domain resource includes a resource for transmitting a reference signal, a content of the first uplink channel received by the network device on the second time domain resource can be correctly demodulated. Even if the first uplink channel on the time domain resource in the first time domain resource that overlaps with the third time domain resource is no longer transmitted, no influence can be brought on the transmission of the first uplink channel on the second time domain resource. And the second uplink channel or signal can also be transmitted on the third time domain resource without being affected by the first uplink channel, thereby ensuring effective transmission of control channels.

In an implementation, the first time domain resource includes the P channel resource units and an incomplete channel resource unit.

In an implementation, the incomplete channel resource unit is located at an end of the first time domain resource.

In an implementation, the incomplete channel resource unit includes the first K1 symbols of a first channel resource unit, a structure of the first channel resource unit and a structure of each of the P channel resource units are the same, and K1 is a positive integer smaller than M.

In an implementation, the second time domain resource includes Q channel resource units, Q is a positive integer and Q is less than or equal to P.

In an implementation, the second time domain resource occupies the first K2 time domain symbols in the first time domain resource, and K2 is a positive integer.

In an implementation, the $(i+1)^{th}$ channel resource unit and the $i^{th}$ channel resource unit of the P channel resource units are adjacent in a time domain, i being from 1 to P-1.

In an implementation, the transceiver 1320 is further configured to transmit configuration information to the terminal device, where the configuration information is used to indicate that the terminal device is enabled to adjust a time domain resource for transmitting the first uplink channel.

In an implementation, the target time domain resource unit includes a slot, a subframe or a frame.

It should be understood that, in the embodiment of the present disclosure, the processor 1310 may be a central processing unit (CPU), and the processor 1310 may also be another general-purpose processor, a digital signal processor (DSP), an application specific integrated circuit (ASIC), a field programmable gate array (FPGA) or another programmable logic device, a discrete gate or a transistor logic device, a discrete hardware component, etc. The general purpose processor may be a microprocessor or the processor may be any conventional processor or the like.

The memory 1330 may include a read only memory and a random access memory, and provide an instruction and data to the processor 1310. Part of the memory 1330 may also include a non-volatile random access memory. In an implementation process, each step in the above method may be performed by an integrated logic circuit of hardware in the processor 1310 or an instruction in the form of software. The steps of the channel transmission method disclosed in the embodiments of the present disclosure may be directly implemented by the hardware processor, or may be performed by a combination of hardware and software modules in the processor 1310. The software module can be located in a conventional storage medium such as a random access memory a flash memory, a read only memory, a programmable read only memory or an electrically erasable programmable memory, a register, and the like. The storage medium is located in the memory 1330. The processor 1310 reads information in the memory 1330 and, in conjunction with its hardware, performs the steps in the above method. To avoid repetition, it will not be described in detail herein.

The network device 1300 according to the embodiment of the present disclosure may correspond to the network device for performing the method 900 in the foregoing method 900, and the network device 1100 according to the embodiment of the present disclosure, where each unit or module in the network device 1300 is configured to perform operations or processes performed by the network device in the above method 900. To avoid repetition, it will not be described in detail herein.

Figure 14:
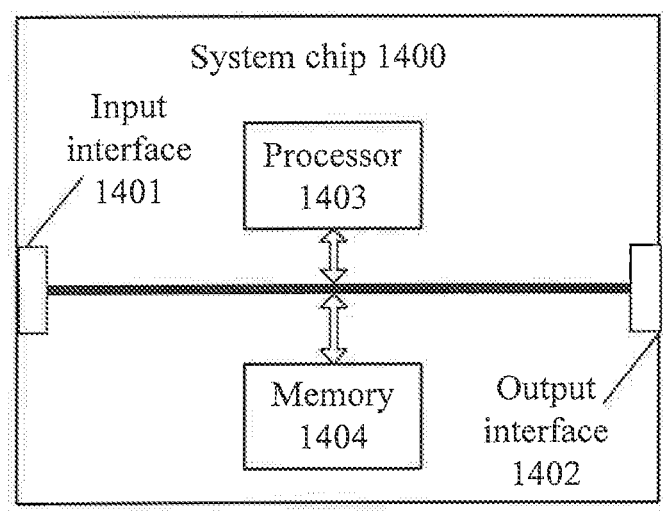
FIG. 14 is a schematic structural diagram of a system chip according to an embodiment of the present disclosure.

FIG. 14 is a schematic structural diagram of a system chip according to an embodiment of the present disclosure. The system chip 1400 of FIG. 14 includes an input interface 1401, an output interface 1402, at least one processor 1403, and a memory 1404. The input interface 1401, the output interface 1402, the processor 1403 and the memory 1404 are connected via an internal connection path. The processor 1403 is configured to execute a code in the memory 1404.

In an implementation, when the code is executed, the processor 1403 may implement a method performed by the terminal device according to the method embodiment 400. For the sake of brevity, details are not described herein again.

In an implementation, when the code is executed, the processor 1403 may implement a method performed by the network device according to the method embodiment 900. For the sake of brevity, details are not described herein again.

Those of ordinary skill in the art will appreciate that elements and algorithm steps of the various examples described in connection with the embodiments disclosed herein can be implemented in electronic hardware or a combination of computer software and electronic hardware. Whether these functions are implemented in hardware or software depends on a specific application and design constraints of the technical scheme. Professionals can use different methods for each specific application to implement the described functionality, but this kind of implementation should not be considered beyond the scope of the present disclosure.

A person skilled in the art can clearly understand that for the convenience and brevity of the description, specific working processes of a system, a device and a unit described above can refer to the corresponding processes in the foregoing method embodiments, and details are not described herein again.

In the several embodiments provided by the present disclosure, it should be understood that the disclosed system, device, and method may be implemented in other manners. For example, the device embodiments described above are merely illustrative. For example, the division of the unit is only a logical function division, in actual implementation, there may be another division manner, for example, multiple units or components may be combined or can be integrated into another system, or some features can be ignored or not executed. In addition, the mutual coupling or direct coupling or communication connection shown or discussed may be an indirect coupling or communication connection through some interfaces, devices or units, and may be electrical, mechanical or otherwise.

The units described as separate components may or may not be physically separated, and the components displayed as units may or may not be physical units, that is, may be located in one site, or may be distributed to multiple network units. Some or all of the units may be selected according to actual needs to achieve the purpose of the solution of the embodiments.

Furthermore, each functional unit in the embodiments of the present disclosure may be integrated into one processing unit, or each unit may be separate physically, or two or more units may be integrated into one unit.

The functions may be stored in a computer readable storage medium if implemented in the form of a software functional unit and sold or used as a standalone product. Based on such understanding, the technical solution of the present disclosure, in nature, or which makes contributions to the prior art, or a part of the technical solution, may be embodied in the form of a software product, which is stored in a storage medium, where a plurality of instructions are included to cause a computer device (which may be a personal computer, a server, or a network device, etc.) to perform all or part of the steps of the method described in the embodiments of the present disclosure. The foregoing storage medium includes: a USB flash disk, a mobile hard disk, a read-only memory (ROM), a random access memory (RAM), a magnetic disk, or an optical disk, and the like which can store program codes.

The foregoing description is only specific embodiments of the present disclosure; however, the scope of protection of the present disclosure is not limited thereto, and changes or substitutions that can be readily think of by any person skilled in the art within the technical scope disclosed in the present disclosure shall be covered by the scope of protection of the present disclosure. Therefore, the protection scope of the present disclosure shall be subject to the protection scope of the claims.

What is claimed is:

1. A channel transmission method, comprising:
receiving, by a terminal device, first information transmitted by a network device at a first moment;
determining, by the terminal device, a first time domain resource for transmitting a first uplink channel according to the first information, wherein the first time domain resource is located in a target time domain resource unit, the first time domain resource comprises P channel resource units, each of the P channel resource units comprises M time domain symbols, and last N time domain symbols of the M time domain symbols are used to transmit a reference signal, wherein P, M, and N are positive integers, and N is not greater than M;
wherein the method further comprises:
receiving, by the terminal device, second information transmitted by the network device at a second moment;
determining, by the terminal device, a second time domain resource for transmitting the first uplink channel according to the second information, wherein the second moment is after the first moment, the second time domain resource is located in the target time domain resource unit and the first time domain resource comprises the second time domain resource; and transmitting, by the terminal device, the first uplink channel to the network device on the second time domain resource;

wherein the determining, by the terminal device, a second time domain resource for transmitting the first uplink channel according to the second information comprises:

determining, by the terminal device, to transmit a second uplink channel or signal on a third time domain resource in the tar et time domain resource unit according to the second information, wherein the third time domain resource at least partially overlaps with the first time domain resource; and determining, by the terminal device, a time domain resource, in the first time domain resource that does not overlap with the third time domain resource as the second time domain resource.

2. The method according to claim 1, wherein the first time domain resource comprises the P channel resource units and an incomplete channel resource unit.

3. The method according to claim 2, wherein the incomplete channel resource unit is located at an end of the first time domain resource.

4. The method according to claim 2, wherein the incomplete channel resource unit comprises first K1 symbols of a first channel resource unit, a structure of the first channel resource unit and a structure of each of the P channel resource units are the same, and K1 is a positive integer smaller than M.

5. The method according to claim 1, wherein the second time domain resource comprises Q channel resource units, Q is a positive integer and Q is less than or equal to P, and the second time domain resource occupies first K2 time domain symbols in the first time domain resource, and K2 is a positive integer.

6. The method according to claim 1, wherein an $(i+1)^{th}$ channel resource unit and an $i^{th}$ channel resource unit of the P channel resource units are adjacent in a time domain, i being from 1 to P-1.

7. The method according to claim 1, wherein before determining, by the terminal device, according to the second information that is transmitted by the network device received at the second moment, the second time domain resource for transmitting the first uplink channel, the method further comprises:

receiving, by the terminal device, configuration information transmitted by the network device, wherein the configuration information is used to indicate that the terminal device is enabled to adjust a time domain resource for transmitting the first uplink channel.

8. A terminal device, comprising:

a processor, a transceiver and a memory, wherein the memory is configured to store instructions, the processor is configured to execute the instructions stored in the memory to control the transceiver to receive or transmit a signal;

the transceiver is configured to receive first information transmitted by a network device at a first moment; and the processor is further configured to determine a first time domain resource for transmitting a first uplink channel according to the first information received by the transceiver, wherein the first time domain resource is located in a target time domain resource unit, the first time domain resource comprises P channel resource units, each of the P channel resource units comprises M time domain symbols, and last N time domain symbols of the M time domain symbols are used to transmit a reference signal, wherein P, M, and N are positive integers, and N is not greater than M;

wherein the transceiver is further configured to receive second information transmitted, by, the network device at a second moment;

the processor is further configured to determine a second time domain resource for transmitting the first uplink channel according to the second information, wherein the second moment is after the first moment, the second time domain resource is located in, the target time domain resource unit and the first time domain resource comprises the second time domain resource; and the transceiver is further configured to transmit the first uplink channel to the network device on the second time domain resource;

wherein the processor is configured to;

determine to transmit a second uplink channel or signal on a third time domain resource in the target time domain resource unit according to the second information, wherein the third time domain resource at least partially overlaps with the first time domain resource; and determine a time domain resource in the first time domain resource that does not overlap with the third time domain resource as the second time domain resource.

9. The terminal device according to claim 8, wherein the first time domain resource comprises the P channel resource units and an incomplete channel resource unit.

10. The terminal device according to claim 9, wherein the incomplete channel resource unit is located at an end of the first time domain resource.

11. The terminal device according to claim 9, wherein the incomplete channel resource unit comprises first K1 symbols of a first channel resource unit, a structure of the first channel resource unit and a structure of each of the P channel resource units are the same, and K1 is a positive integer smaller than M.

12. The terminal device according to claim 8, wherein the second time domain resource comprises Q channel resource units, Q is a positive integer and Q is less than or equal to P, and the second time domain resource occupies first K2 time domain symbols in the first time domain resource, and K2 is a positive integer.

13. The terminal device according to claim 8, wherein an $(i+1)^{th}$ channel resource unit and an $i^{th}$ channel resource unit of the P channel resource units are adjacent in a time domain, i being from 1 to P-1.

14. The terminal device according to claim 8, wherein the transceiver is further configured to:

receive configuration information transmitted by the network device, wherein the configuration information is used to indicate that the terminal device is enabled to adjust a time domain resource for transmitting the first uplink channel.

15. The terminal device according to claim 8, wherein the target time domain resource unit comprises a slot, a subframe or a frame.

* * * * *